July 14, 1953

C. H. HORN ET AL 2,645,239

EMERGENCY SHUTOFF VALVE

Filed Jan. 3, 1950

INVENTORS
CHARLES H. HORN
SIDNEY H. SMITH

BY *Westall & Westall*

ATTORNEYS

July 14, 1953  C. H. HORN ET AL  2,645,239
EMERGENCY SHUTOFF VALVE
Filed Jan. 3, 1950  2 Sheets-Sheet 2

INVENTORS
CHARLES H. HORN
SIDNEY H. SMITH
BY Westall & Westall
ATTORNEYS

Patented July 14, 1953

2,645,239

UNITED STATES PATENT OFFICE 2,645,239

EMERGENCY SHUTOFF VALVE

Charles H. Horn, Sunland, and Sidney H. Smith, Burbank, Calif.

Application January 3, 1950, Serial No. 136,522

4 Claims. (Cl. 137—87)

This application is a continuation-in-part of our co-pending application, S. N. 66,242, filed December 20, 1948, for Emergency Shut-Off Valve and now abandoned.

This invention relates to fluid control systems and more specifically contemplates valvular mechanisms for controlling air brake apparatus of the type commonly employed in truck and trailer combinations.

It is essential that heavy trailers for automotive vehicles be equipped with independently operable braking mechanism adapted for control from the cab of the towing vehicle. In large truck and trailer combinations the brake apparatus for each sectional component is commonly air-actuated, the brakes of the trailer being controlled through a flexible air line extending between the truck and trailer. In order to assure actuation of the trailer brakes, in the event that the trailer breaks away from the truck, an emergency line is provided which connects the pressure reservoir carried by the truck with a relay valve comprising a part of the trailer system. The relay valve is interposed between an auxiliary source of fluid pressure in the trailer and the trailer brake cylinders and is normally held closed by the pressure transmitted by the emergency line. Any break or substantial leak in the emergency line relieves pressure upon the relay valve permitting the latter to open communication between the auxiliary air pressure reservoir carried by the trailer and the trailer brake system. Thus, while the failure of the emergency line will result in the application of the brakes of the trailer, the opening of the emergency line tends to bleed the truck air system leaving the truck without effective braking action. Moreover, should the service line to the trailer be broken while the emergency line remains intact, the pressure of the truck fluid system will be correspondingly lowered but the trailer brakes will not be automatically applied through the action of the relay valve or at all.

It is, therefore, a principal object of the present invention to obviate the aforementioned deficiencies of the prior art by the provision of a control valve adapted for interposition between the braking system of a truck and trailer combination such as above-described, the valve being operable to seal both of the connecting lines between the truck and trailer in the event of the fracture of either thereof, so as to prevent loss of pressure in the truck system and assure application of the trailer brakes in response to the pressure of the auxiliary trailer reservoir.

More specifically, it is an object to provide valvular mechanism comprising a pair of complementary fluid pressure-actuated valves controlling, respectively, the service line and emergency line between the truck and trailer, the pressure of the truck system being normally effective to maintain the valves open with the emergency line active and the service line available for application of the trailer brakes, the relief of pressure in the emergency line being operable to close both valves so as to preserve pressure in the truck system while permitting application of the trailer system through the trailer relay valve and auxiliary pressure source.

Another object is the provision in a brake system of the type referred to of a manually operable dump valve by which pressure in the emergency line may be relieved sufficiently to permit application of the trailer brakes incident to actuation of the trailer relay valve and thereby preserve pressure in the truck system which would otherwise be lost in the event of fracture of the service line, thus enabling independent application of the truck brakes by conventional controls.

Numerous other objects and salient features of our invention, such for example, as adaptability of the valve unit to incorporation in conventional truck and trailer systems, positive control of both truck and trailer brakes under all circumstances, simplicity of operation, economy of manufacture, sensitive response and facility of installation, will be apparent to those of skill in the art from an examination of the following description read in the light of the accompanying drawings, in which.

Figure 1:
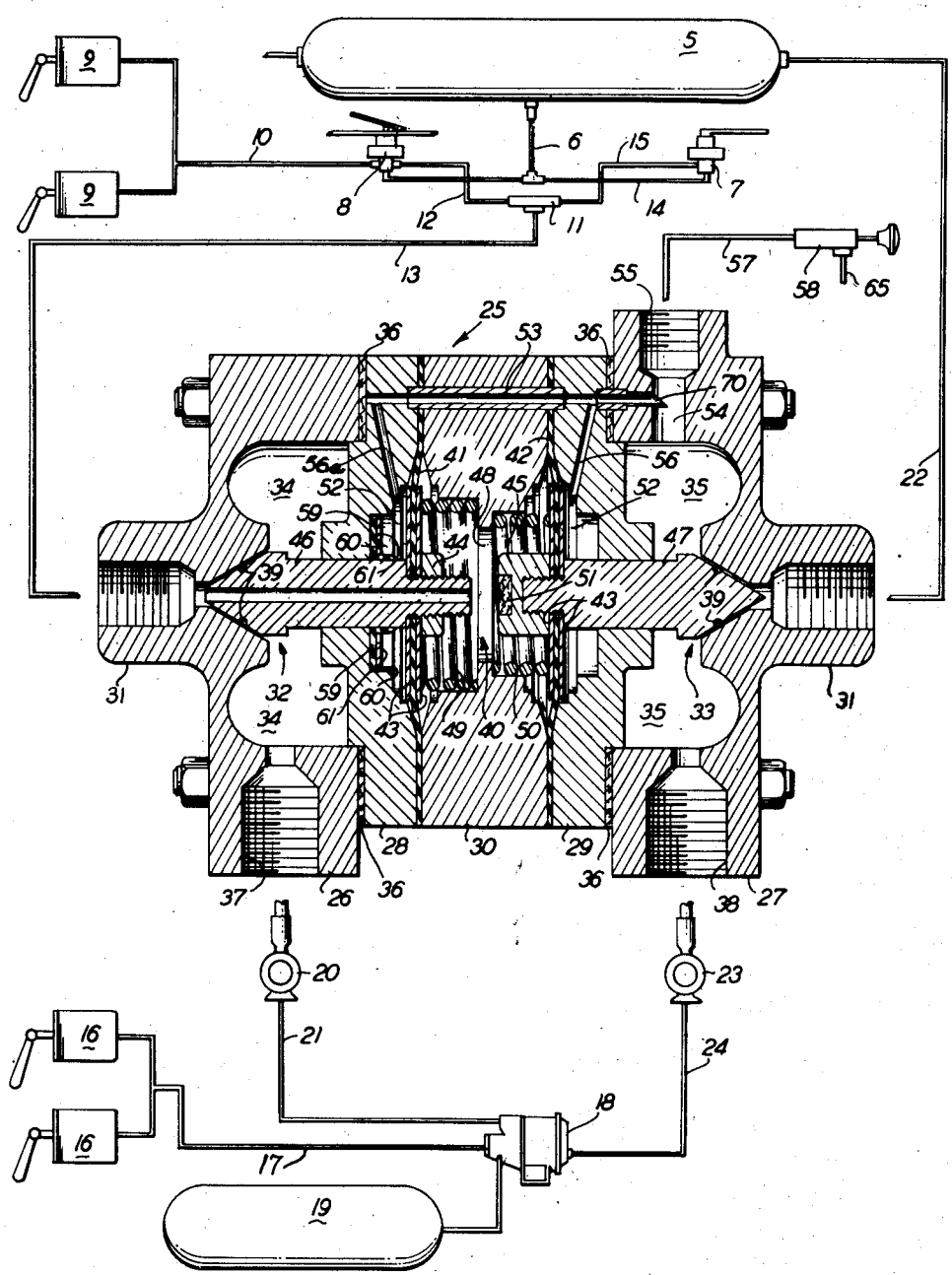
Fig. 1 is a sectional view through a valve mechanism embodying our invention, and illustrating diagrammatically the truck and trailer brake system in combination therewith.
Figure 2:
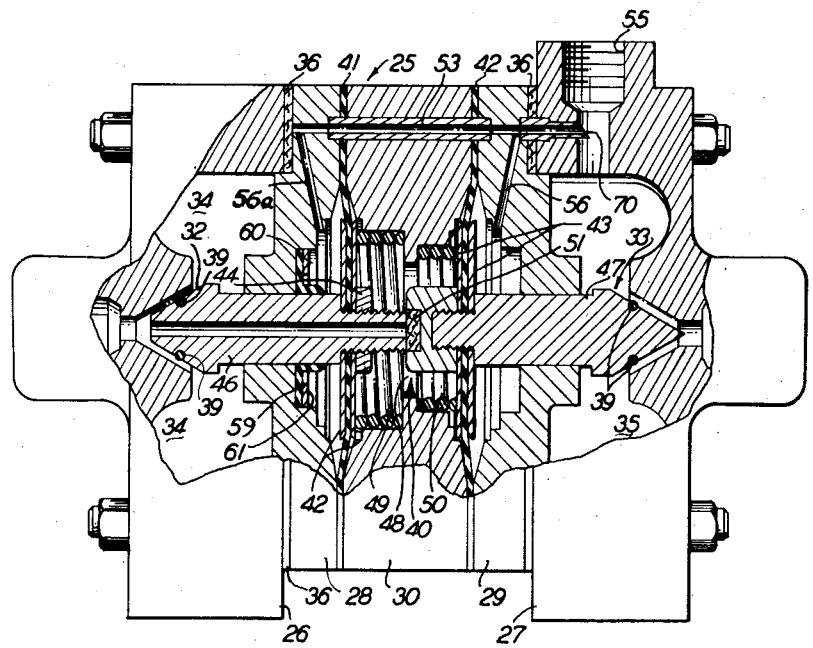
Fig. 2 is a sectional view through the valve mechanism showing the valves in normal operative positions in which they are displaced from their seats.

Referring to the drawings more in detail, the numerals of which indicate similar parts throughout the several views, 5 designates a tank comprising an air pressure reservoir provided primarily for the truck braking system, the tank being supplied with air, to maintain under normal conditions a minimum pressure therein, by a pump (not shown). A conduit 6 leads from the tank 5 to a hand valve 7 and a treadle valve 8, both of which are normally disposed in the cab of the truck for manipulation by the driver when occasion requires. The treadle valve 8 is connected to both the truck brake cylinders, indicated generally by the numeral 9, by conduit 10 and to a shuttle valve 11, of conventional construction, by a conduit 12 from which pressure fluid may be directed into a service line 13 leading to the trailer as is hereinafter more in detail described, whereby operation of the treadle valve 8 is normally effective to apply both truck and trailer brakes. The hand valve 7 controls flow through a conduit comprising a section 14 leading from the tank 5 and a section 15 to a shuttle valve 11, and thus is utilized to direct pressure to the trailer braking system through the service line 13, above referred to, without application of the truck brakes.

The trailer brake system comprises brake cylinders 16 adapted for actuation in response to pressure supplied through a conduit 17 leading from a conventional relay valve 18 carried by the trailer. The valve 18, which may be of the type disclosed in the United States Patent No. 2,024,343, granted December 17, 1935, controls the flow of pressure fluid to the brake cylinders 16 from both the service line 13 and from an auxiliary emergency pressure tank 19 carried by the trailer. Accordingly, the service line 13 from the truck terminates in a connector 20 to which a flexible line 21 leading to the relay valve 18 is attached upon assembly of the truck and trailer combination. In accordance with normal operation of the unit, application of the treadle valve 8 supplies actuating pressure from the truck tank 5 to the trailer brakes 16 through the service line 13 and relay valve 18. Communication between the auxiliary tank 19 and the trailer brakes is normally closed by the relay valve 18 in response to pressure introduced thereinto by an emergency line 22 leading from the truck tank 5 through a suitable connector 23 and an auxiliary flexible emergency line 24. Being well known in the art, the construction of the relay valve 18 is not illustrated in detail. It will suffice to state that a drop in pressure in the emergency line 22 and 24 is effective to open the relay valve 18 for communication of the auxiliary emergency tank 19 with the trailer brake cylinders 16. With conventional equipment with the type described, it will be appreciated that as long as the emergency line 22 and 24 remains unbroken the trailer brakes may be applied only by opening the treadle valve 8 so as to introduce pressure from the truck pressure tank 5 into the trailer brake system through the service line 13 and 21. Should the service line be broken without corresponding severance of the emergency line 22 and 24 no means is provided in conventional equipment of the type described for applying the trailer brakes.

In order to overcome these deficiencies we provide valvular mechanism which is interposed in the service and emergency lines 13 and 22. The mechanism comprises a sectional casing 25 composed of sections 26, 27, 28, 29 and 30 which are bolted or otherwise secured together. At opposite sides of the casing 25, sections 26 and 27 are formed with threaded bosses 31, adapted to receive in threaded engagement the service and emergency lines, respectively. Reciprocable within the casing sections 28 and 29 are a pair of poppet-type valves 32 and 33, their stems 46 and 47 being coaxially related and disposed to enable control by the valves of the flow into the casing from the respective service and emergency lines 13 and 22. Each of the end sections 26 and 27 of the casing are counterbored to form chambers 34 and 35 sealed by the adjacent section 28 and 29, respectively. 36 indicates each of a pair of gaskets interposed between the sections 26 and 28 and between the sections 27 and 29. Internally threaded bosses 37 and 38 opening into the respective chambers 34 and 35 provide means of connection to the valve assembly of the sections of the service and emergency lines 13 and 22, respectively, leading to the connectors 20 and 23. 39 indicates a ring seal with which each valve is equipped. The valves extend reciprocably through the respective sections 28 and 29 into a central pressure chamber 40 formed in the central section 30 of the casing, their inner ends projecting through flexible diaphragms 41 and 42, composed of rubber or the like clamped between the section 30 and each of the sections 28 and 29, by which the valves are actuated in response to the pressure of fluid thereagainst, as is hereinafter described. The diaphragms 41 and 42 are clamped between washers 43 which are secured rigidly to the respective valves by nuts 44 and 45 threaded on the ends of the valve stems 46 and 47, respectively. The central chamber 40 into which the valve stems are retracted when the valves are displaced from their seats, is formed with an annular restriction 48 which provides seats for a pair of helical springs 49 and 50 adapted to bear against the respective inner washers 43 reinforcing the diaphragms 41 and 42 so as to normally urge the valves 32 and 33 toward closed positions. Spring 49 is heavier and its urge is stronger than the spring 50 whereby the valves are responsive to different fluid pressures, for a purpose later made apparent. The valve 32 and its stem 46 is tubular, whereby the chamber 40 between the diaphragms 41 and 42 may be communicated with the service line 13 through the bore of the valve and stem. Thus, air pressure emitted into the service line is utilized under certain conditions, to supplement the action of the springs 49 and 50 in urging both valves 32 and 33 to closed positions so as to shut off the service line 13 to the trailer brake mechanism, and correspondingly, close off the emergency line 22. When the valves are fully opened, the end of the valve stem 46 abuts against the nut 45, the latter being fitted with a disk 51 of compressible material such as fiber or the like to seal the bore of the valve stem 46. Each of the casing sections 28 and 29 is recessed to form a flat chamber 52 behind each diaphragm into which pressure fluid from the chamber 35 is directed through a passage 53 formed in the casing. The passage extends laterally from a restricted passage 54 communicating the chambers 35 with a threaded evacuation port 55 formed in the section 27. The passage 53 extends through the sections 27, 29 and 30 and terminates in section 28. Oblique branch passages 56 and 56a diverge from the passage 53 so as to open into the respective flat chambers 52. Thus, pressure built up in the chamber 35 is at all times communicated to the flat chambers 52 so as to exert a force proportionate to the pressure tending to displace the valves 32 and 33 from their seats. Threaded into the port 55 is a conduit 57 leading to a dump valve 58 mounted in the cam of the truck. By manually opening the dump valve 58 pressure in the chamber 35 and correspondingly in chambers 52 may be quickly relieved. 59 indicates a gland composed of neoprene or the like encircling the valve stem 46 within an annular recess 60 formed in the casing section 28 which is in open communication with the adjacent chamber 52 so as to prevent loss of pressure around the valve stem 46. The gland 59 is held in position by a washer 61 pressed or otherwise secured in the bore of the recess 60.

Figure 3:
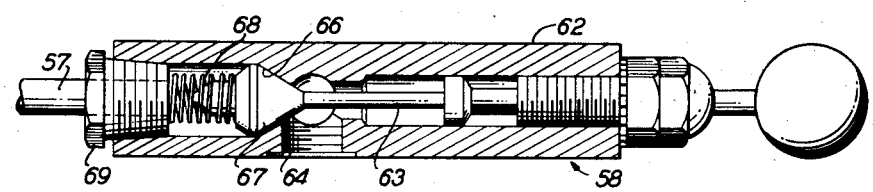
Fig. 3 is a longitudinal sectional view through the dump valve.

The dump valve 58, above referred to, and illustrated in Fig. 3 comprises a casing 62 into which a plunger 63 is slidably reciprocable. One end of the casing opposite from which the plunger projects is connected to the conduit 57. A lateral port 64 is fitted with a discharge tube 65 opening into the atmosphere. An annular valve seat 66 intermediate the conduit 57 and lateral port 64 is controlled by a valve 67 connected to the inner end of the plunger 63 whereby depression of the plunger is effective to dislodge the valve from its seat 66 and permit the flow of air from the conduit 57 through the valve seat, lateral port 64 and thence to the atmosphere so as to evacuate the chamber 35 in the valve casing. A spring 68, interposed between the valve 67 and a fitting 69 in the end of the casing 62, by which the conduit 57 is attached, is operable to exert a resilient urge tending to maintain the valve closed.

In order to further expedite the function of the dump valve in evacuating the chamber 35, we provide a Venturi tube in the end of the passage 53 so as to project into the restricted passage. It will be appreciated that the rush of air through the passage upon the opening of the dump valve entrains air from the passage 53 so as to more quickly lower the pressure in back of the diaphragms and permit the valves to close.

The operation of the illustrated embodiment of our invention is further briefly described as follows: It will be understood that the connectors 20 and 23 incorporate valve mechanism by which the emergency 22 and service lines 13 may be closed off until the trailer is attached to the truck and the flexible service and emergency lines 21 and 24 of the trailer are correspondingly connected. The pressure of air transmitted through the emergency line 22 is effective to displace the valve 33 from its seat overcoming the expansive urge of the spring 50 so as to build up pressure in the auxiliary trailer tank 19 through the relay valve 18. As above-indicated, the relay valve is so constructed that the pressure transmitted by the emergency line 22 and 24 maintains closed communication between the auxiliary tank and trailer brake cylinders 16. The service line 13, however, is open to the brake cylinders 16 through the relay valve 18.

The pressure introduced into the chamber 35 from the emergency line 22 which is operable to maintain the valve 33 in open position also is communicated through the passage 53 and branch passages 56 and 56a, to the chambers 52 behind the respective diaphragms so as to assist in holding open the emergency valve 33 and to overcome the expansive urge of the spring 49, displacing the valve 32 from its seat. In such position, the abutment of the end of the valve stem 46 against the nut 45 causes the fiber insert 51 to close the bore of the stem 46 and to prevent air pressure subsequently introduced in the service line 13, in accordance with the normal operation of the device, from entering the central chamber 40. Accordingly, the opening of the treadle valve 8 or the hand valve 7 directs pressure from the truck reservoir tank 5 through the conduit 10 and service line 13 resulting in the application of both the trailer and truck brakes. It will be understood that the pressure applied is greater than the expansive urge of the spring 49 tending to move the valve 32 to closed position. Should the emergency line 22 be severed or a leak develops therein sufficient to materially lower the pressure, the relay valve 18 will function in a conventional manner, in response to the pressure of the auxiliary trailer tank 19, and coincidentally direct the pressure from the latter source into the trailer brake cylinders 16 so as to apply the trailer brakes. Damage to the lines usually occurs between the truck and trailer and in the absence of the valvular mechanism, contained in the casing 25, comprising an essential part of our invention, the pressure within the truck tank 5 is relieved through the broken line making it impossible to apply the truck brakes. In accordance with the present invention, however, a drop of fluid pressure in the emergency line 22 results in a corresponding drop in the chamber 35 and through the passages 53, 54, 56 and 56a behind the diaphragms 41 and 42 whereupon both valves are closed in response to the urge of the springs 49 and 50. Evacuation of air pressure within the valve chamber 35 may be expedited by manually opening the dump valve 58. Thus, the trailer brakes are applied by the pressure from the trailer reservoir tank 19. The treadle valve 8 may be actuated by the driver of the truck so as to coincidentally actuate the truck brakes and also introduce pressure into the central chamber 40 of the valve casing through the bore of the valve stem 46. Accordingly, with the pressure behind the diaphragms 41 and 42 relieved either the break in the emergency line 22 or incident to opening the dump valves 58 the pressure within the central chamber 40 is effective to maintain both valves closed thus preserving the pressure of the reservoir truck tank 5 for use in applying the truck brakes.

It will be appreciated that the operation of the valvular mechanism will be substantially the same in the event that the service line 13 is also broken, the positions of the valves being primarily controlled by pressure in the valve chamber 35.

In the event that the service line 13 only is broken, pressure in the reservoir tank 5 would, in the absence of valvular mechanism contained in the casing 25, be lost through the break, preventing the application of both the truck brakes and the trailer brakes by the driver. Moreover, if the emergency line 22 remains intact, the trailer brakes will not be applied by pressure from the emergency tank 19 until after pressure in the truck reservoir 5 has dropped to a substantial degree. In accordance with the present invention, however, the driver may immediately evacuate the valve chamber 35 by opening the dump valve 58 whenever any drop in the pressure of the reservoir tank 5 is noted. Such operation will result in the application of the trailer brakes in response to pressure in the emergency reservoir tank 19 and incident to the relief of pressure behind the diaphragms 41 and 42 assure immediate closure of the respective valves 32 and 33 so as to seal off the broken section of the line between the truck and trailer, thereby preserving pressure within the truck tank 5 for its utility in applying the truck brakes.

As the prompt application of the brakes after the discovery of a leak or break in one of the lines may be imperative, it is essential not only that the chamber 35 be evacuated immediately, which function is effected through the dump valve 58, but that the valves 32 and 33 be closed with equal speed. By provision of the Venturi tube 70 disposed in the restricted passage 54, through which the air is relieved upon the opening of the dump valve, the chambers 52 behind the respective diaphragms 41 and 42 are evacuated more promptly, thus expediting the closing of the valves.

While we have shown and described but a single embodiment of our invention, it will be understood that numerous changes in size, design, shape, number and proportion of the various parts may be made, and particularly that the relationship of the various parts may be modified variously while retaining the advantages and essential functions of the structure—without departing from the spirit of our invention as defined by the appended claims.

What we claim and desire to secure by Letters Patent is:

1. In a device of the character described, a casing having a pair of inlets and corresponding outlets, a valve between each inlet and its corresponding outlet, each valve comprising a movable valve stem, said stems in their open positions having their base ends in abutting engagement with each other, one of said stems having an axial bore therethrough, the other stem having means thereon for sealing said bore when said stems are in abutting relation, said casing having a chamber surrounding the said base ends, spring means for urging said stems to separate, said stems being adapted to be held in their abutting position by fluid pressure acting through said inlets against the action of said springs, a flexible diaphragm for each stem connecting the wall of the chamber to the stem, said diaphragms being spaced apart and having their inner sides facing each other, whereby, when the stems are separated, fluid pressure acting through said bore against the inner sides of said diaphragms will urge the stems to and maintain them in their closed positions.

2. In a device of the character described, a casing having a pair of inlets and corresponding outlets, a valve between each inlet and its corresponding outlet, each valve comprising a movable valve stem, said stems in their open positions having their base ends in abutting engagement with each other, one of said stems having an axial bore therethrough, the other stem having means thereon for sealing said bore when said stems are in abutting relation, said casing having a chamber surrounding the said base ends, spring means for urging said stems to separate, said stems being adapted to be held in their abutting position by fluid pressure acting through said inlets against the action of said springs, a flexible diaphragm for each stem connecting the wall of the chamber to the stem, said diaphrams being spaced apart and having their inner sides facing each other, whereby when the stems are separated, fluid pressure acting through said bore against the inner sides of said diaphragms will urge the stems to and maintain them in their closed positions, ducts through said casing communicating the outer sides of said diaphragms with one of said outlets.

3. In a device of the character described, a casing having a pair of inlets and corresponding outlets, a valve between each inlet and its corresponding outlet, each valve comprising a movable valve stem, said stems in their open positions having their base ends in abutting engagement with each other, one of said stems having an axial bore therethrough, the other stem having means thereon for sealing said bore when said stems are in abutting relation, said casing having a chamber surrounding the said base ends, spring means for urging said stems to separate, said stems being adapted to be held in their abutting position by fluid pressure acting through said inlets against the action of said springs, a flexible diaphragm for each stem connecting the wall of the chamber to the stem, said diaphragms being spaced apart and having their inner sides facing each other, whereby, when the stems are separated, fluid pressure acting through said bore against the inner sides of said diaphragms will urge the stems to and maintain them in their closed positions, ducts through said casing communicating the outer sides of said diaphragms with one of said outlets, said casing having also an additional auxiliary valved outlet communicating with said ducts.

4. In a device of the character described, a casing having a pair of inlets and corresponding outlets, a valve between each inlet and its corresponding outlet, each valve comprising a movable valve stem, said stems in their open positions having their base ends in abutting engagement with each other, one of said stems having an axial bore therethrough, the other stem having means thereon for sealing said bore when said stems are in abutting relation, said casing having a chamber surrounding the said base ends, spring means for said stems to urge them to their closed positions, said stems being adapted to be held in their open positions by fluid pressure acting through said inlets against the action of said springs, a flexible diaphragm for each valve stem connecting the wall of the chamber to the stem, whereby, when the stems are separated, fluid pressure acting through said bore against said diaphragms augments the action of said springs to maintain the valves closed.

CHARLES H. HORN.
SIDNEY H. SMITH.

References Cited in the file of this patent

UNITED STATES PATENTS

| Number | Name | Date |
|---|---|---|
| 1,973,326 | Besler | Sept. 11, 1934 |
| 2,084,707 | Robinson | June 22, 1937 |
| 2,451,139 | Williams et al. | Oct. 12, 1948 |